(12) United States Patent
Vera

(10) Patent No.: US 8,199,790 B2
(45) Date of Patent: Jun. 12, 2012

(54) REACTOR VESSEL FOR PLASMA GASIFICATION

(75) Inventor: Rodrigo B. Vera, Leeds, AL (US)

(73) Assignee: Plasma Waste Recycling, Inc., Huntsville, AL (US)

( * ) Notice: Subject to any disclaimer, the term of this patent is extended or adjusted under 35 U.S.C. 154(b) by 584 days.

(21) Appl. No.: 11/934,476

(22) Filed: Nov. 2, 2007

(65) Prior Publication Data

US 2009/0116532 A1  May 7, 2009

(51) Int. Cl.
*H05B 1/00* (2006.01)
*B23K 9/02* (2006.01)
*F23G 5/00* (2006.01)

(52) U.S. Cl. .................. 373/18; 219/121.36; 110/346

(58) Field of Classification Search ............. 219/121.36, 219/121.37, 121.42, 121.5, 121.53; 266/175, 266/186; 373/18, 19, 20, 21, 22, 23, 24; 110/250, 341, 256, 257
See application file for complete search history.

(56) References Cited

U.S. PATENT DOCUMENTS

| | | | |
|---|---|---|---|
| 4,361,965 A | 12/1982 | Goumondy et al. | |
| 4,644,877 A | 2/1987 | Barton et al. | |
| 5,387,321 A | 2/1995 | Holland | |
| 5,480,474 A | 1/1996 | Ulrich | |
| 5,534,659 A * | 7/1996 | Springer et al. | 110/346 |
| 5,536,114 A | 7/1996 | Wetmore et al. | |
| 5,544,597 A | 8/1996 | Camacho | |
| 5,614,156 A | 3/1997 | Wang | |
| 5,615,626 A | 4/1997 | Floyd et al. | |
| 6,155,182 A | 12/2000 | Tsangaris et al. | |
| 6,160,238 A * | 12/2000 | Titus et al. | 219/121.37 |
| 6,215,678 B1 | 4/2001 | Titus et al. | |
| 6,258,994 B1 | 7/2001 | Jantzen et al. | |
| 6,380,507 B1 | 4/2002 | Childs | |
| 6,410,880 B1 | 6/2002 | Putvinski et al. | |
| 6,454,833 B1 * | 9/2002 | Nagl et al. | 75/448 |
| 6,576,210 B2 | 6/2003 | Surma | |
| 6,605,209 B2 | 8/2003 | Lei et al. | |
| 6,620,092 B2 | 9/2003 | Albus et al. | |
| 6,701,855 B2 | 3/2004 | Barba | |
| 6,815,572 B1 | 11/2004 | Brunelot et al. | |
| 6,817,388 B2 | 11/2004 | Tsangaris et al. | |
| 6,827,912 B2 * | 12/2004 | Schingnitz et al. | 422/198 |

(Continued)

*Primary Examiner* — Henry Yuen
*Assistant Examiner* — Hung D Nguyen
(74) *Attorney, Agent, or Firm* — George P. Kobler; Lanier Ford Shaver & Payne, P.C.

(57) ABSTRACT

Disclosed herein is a reactor vessel for plasma gasification reactors employing a DC graphite electrode, AC graphite electrodes, AC plasma torches or DC plasma torches to create a high-energy plasma arc for the pyrolytic decomposition of feed materials. The vessel is configured with an upper portion and a lower portion, where the lower portion is for the containment of a layer of molten metal (iron) and a second layer of slag and having a substantially uniform width, while the upper portion being for the containment of gas and having a varying width. The reactor vessel comprises a steel shell housing a multi-layered wall that defines a chamber where the multi-layered wall includes a first layer high-density refractory material, a second intermediate layer of a insulating material, and a third outer layer of high-density refractory materials. The vessel also includes a multi-layered bottom a first bottom layer comprised of one or more layers of high-density refractory material, and a second bottom layer comprised of insulating materials. The vessel has at least one opening in the wall of the vessel for the introduction of feed material located just above the slag layer.

6 Claims, 3 Drawing Sheets

U.S. PATENT DOCUMENTS

| | | |
|---|---|---|
| 6,852,293 B1 | 2/2005 | Ronchi |
| 7,026,570 B2 | 4/2006 | Remy |
| 7,108,808 B1 | 9/2006 | Richards |
| 7,120,185 B1 | 10/2006 | Richards |
| 7,169,197 B2 | 1/2007 | Serio et al. |
| 2003/0174756 A1* | 9/2003 | Groen .......................... 374/141 |
| 2004/0170210 A1* | 9/2004 | Do et al. ....................... 373/118 |
| 2006/0144305 A1* | 7/2006 | Vera .............................. 110/250 |

* cited by examiner

REACTOR VESSEL FOR PLASMA GASIFICATION

BACKGROUND

1. Field of the Invention

This invention relates generally to a high temperature reactors, and, more particularly, to the reactor vessels for such reactors.

2. Description of the Problem

High temperature reactors, such as plasma reactors used for pyrolitic conversion of waste to constituent metals and organic matter, can create gaseous matter such as carbon monoxide (CO), and hydrogen that may be used in many other processes. These reactors are fed solid materials, including without limitation, municipal solid waste (MSW), which are exposed to high energy generated by a plasma arc. The energy levels are greater than the Gibbs' "Enthalpy of Formation" values for the material being processed, and, consequently, the processed material is dissociated. The result in the reactor chamber is a gas typically composed of carbon, hydrogen, nitrogen, and hydrogen chloride, acetylene, methane, polycyclics and other gases which rise to the top portion of the reactor chamber. Below that gas region is a layer of frothy "slag" in which resides oxidized metals such as silica ($SiO_2$), Magnesium Oxide (MgO) lime (CaO) and Aluminum Oxide ($Al_2O_3$). Forming a layer on the bottom of the chamber is a bed of molten iron with certain amounts of dissolved alloys dependent on the composition of the feed materials.

The gas resulting from the conversion is useful in other industries. For example, the gas may be used to make methanol which may in turn be used to make a number of other chemicals, including butanol, MTBE and even gasoline using the Mobil process. However, unless several process variables are controlled, the purity and density of the gas is unpredictable. One variable affecting the resulting gas properties is the amount of outside air that may be drawn in to the processing system. Thus, the reaction chamber should be airtight as much as possible. Feeding the material into the reaction chamber, however, increases the likelihood of outside air being introduced and corrupting the reaction. Accordingly, it is desirable to reduce the amount of outside air that enters the reaction chamber that may be trapped within the feed material to be processed. Efforts to reduce entry of outside air into the reaction include compaction of the MSW feed materials as described in co-owned and co-pending U.S. patent Ser. No. 11/809,810, filed Jun. 1, 2007, and incorporated by reference herein.

A concern with current designs of reactor chambers is that feed of the MSW is from the top of the chamber. This results in turbulent disturbance of the slag layer, which results in increased particulate matter in the gaseous layer, which contaminates the product gases.

Additionally, it is desirable to control the velocity of the gas traveling upward in the reactor prior to extraction in order for there to be as great a likelihood as possible for reformation of the gases into useful CO and $H_2$, for example and to decrease the likelihood of ionized gases exiting the chamber.

SUMMARY

The present invention seeks to remedy this problem by providing a reactor vessel that is configured to be substantially free of outside air, and free of turbulence in the slag layer. The reactor vessel is fed from the side with the opening of the feed tube located in the wall of the reactor vessel just above the slag layer.

Disclosed herein is a reactor vessel for plasma gasification reactors employing a DC or AC graphite electrodes or an AC or DC plasma torch to create a high-energy plasma arc for the pyrolytic decomposition of feed materials. In one embodiment, the vessel is configured with an upper portion and a lower portion, where the lower portion is for the containment of a layer of molten metal (iron) and a second layer of slag and having a substantially uniform width, while the upper portion being for the containment of gas and, in one embodiment, having a varying width or diameter. The reactor vessel comprises a steel shell housing a multi-layered wall that defines a chamber where the multi-layered wall includes a first layer of a high-density refractory material, a second intermediate layer of a medium density refractory material, and a third and fourth outer layer of low density insulating materials.

In another embodiment, the entire reactor vessel has width that is uniform through the height of the reactor chamber. However, the upper portion is of a length to allow time for gaseous matter to reform into syngas.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to the Figures. The elements of the drawings are not necessarily to scale, emphasis instead being placed upon clearly illustrating the principles of the invention. Throughout the drawings, like numerals are used for like and corresponding parts of the various drawings.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment. Moreover, features described with respect to a particular embodiment may also be employed in other disclosed embodiments as those skilled in the relevant arts will appreciate. This invention may be provided in other specific forms and embodiments without departing from the essential characteristics as described herein. The embodiments described below are to be considered in all aspects as illustrative only and not restrictive in any manner.

Figure 1:
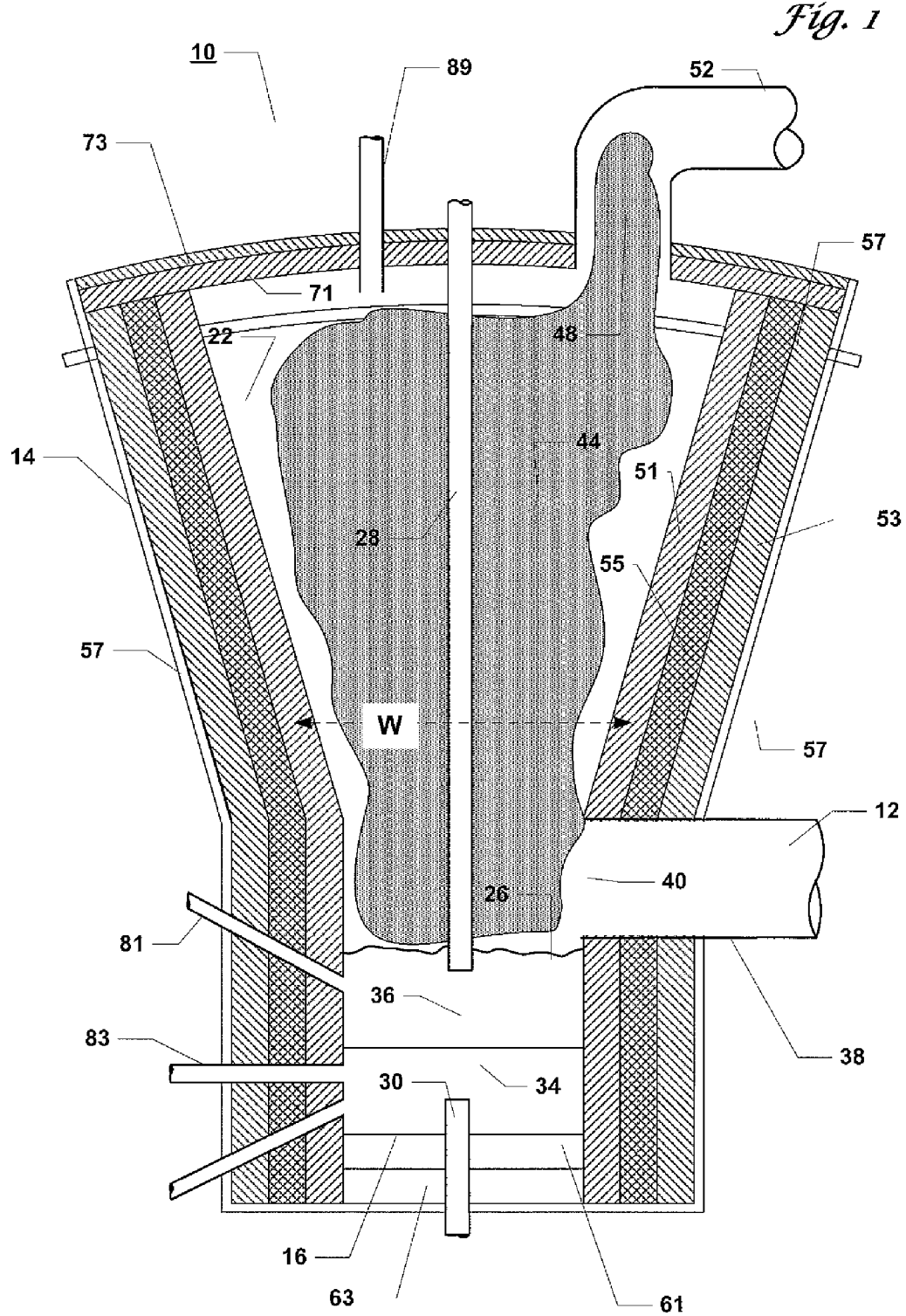
FIG. 1 is an elevation section view of an exemplary plasma gasification system embodying the principles of the present invention.

Referring now in detail to the drawings, there is illustrated in FIG. 1, a pictorial diagram of an apparatus 10 for plasma gasification of hazardous and non-hazardous materials contained in organic and inorganic products. The apparatus 10 includes a feeder system 12, and a refractory-lined reactor vessel 14. The feeder system 12 is provided for feeding the hazardous and non-hazardous feed materials consisting of organic and inorganic components into the refractory-lined reactor vessel 14 at a controlled rate. The feeder system feeds a stream of shredded and compact feed materials, or other materials into the reactor vessel in a continuous manner. The hazardous and non-hazardous materials may include, but are not limited to, municipal solid waste (MSW), medical type waste, radioactive contaminated waste, agricultural waste, pharmaceutical waste, and the like. It will be appreciated that materials that may be processed in such a reactor vessel are not limited to waste materials, but can include anything that may be gasified.

The feed materials are delivered into the reactor vessel at a controlled rate so as to expose a predetermined amount of compacted materials to the thermal decomposition (pyrolysis) process for regulating the formation of product synthesis gases (syngas). The feed rate is dependent upon the characteristics of the feed materials as well as the temperature and oxygen conditions within the reactor vessel. Inside of the reactor vessel 14, a high temperature plasma arc generates temperatures in excess of 2,900 degrees F. in the slag so that, upon entry of the feed stream into the slag layer, it is immediately dissociated with the organic portion of the feed material being converted to carbon, oxygen and hydrogen and the inorganic portion and metals of the feed material melted with the metal oxides being reduced to metal. A DC graphite electrode 28 extends from the top of the reactor roof and a counter-electrode 30 formed in the bottom of the reactor vessel are connected to a DC power supply (not shown) and are used to create the high temperature plasma arc, as will be more fully described below. Alternatively, the electrical circuit can be achieved with two DC electrodes through the top or sides of the reactor. Additionally, two DC power supplies for each of the two top DC electrodes may be used in conjunction with a counter-electrode in the furnace bottom. When two separate DC power supplies are used, each one is connected to one of the top electrodes and the bottom anode electrode. The process vessel can also be configured with the cathode in the bottom and anode in the top. In addition, the DC electrodes may be substituted with AC graphite electrodes, AC plasma torches or DC plasma torches.

The bottom 16 of the reactor vessel 14 defines a hearth for receiving a molten metal bed or bath 26 which is heated by the arc generated between the DC top graphite electrode 28 and the bottom electrode 30. The top electrode 28 extends downward into the reactor vessel with its lower end being submerged in the molten slag bath 26 which sits on top of the metal due to the fact that the bulk density of the slag is lower than the bulk density of the metal. The bottom electrode 30 is mounted through the center of the bottom 16 of the reactor vessel, facing opposite to the top electrode 28. Alternatively, it should be understood by those skilled in the art that the bottom electrode 30 may be achieved with a conductive plate that defines the bottom 16 of the reactor vessel, or multiple electrodes, or pins, may be spaced substantially uniformly throughout the bottom 16 of the reactor vessel in lieu of using the rod electrode as illustrated.

During operation, the molten bath 26 filling the bottom 16 of the reactor vessel 14 will be separated into a bottom metal (iron) layer 34 and an inorganic "foamy" or "gassy" slag layer 36. It will be noted that the lower end of the top electrode 28 is preferably submerged into the slag layer 36. The feed materials are fed into the vessel 14 via a feeder extrusion tube 38 and through opening 40 defined in vessel wall. By injecting the feed materials directly above the slag layer 36 of the molten bath 26, the feed materials are immediately subjected to very high temperatures, i.e., above 2900 degrees F., that completely disassociate the feed materials. Moreover, extrusion tube 38 and opening 40 are located just above the slag layer 36 in order to reduce entrainment of gas within the feed material as it falls into the molten bath 26.

The organic portion of the feed material will disassociate into the synthesis gas (or "syngas") 44 consisting of a carbon, carbon monoxide and hydrogen mixture and rising to the upper portion of the reactor vessel 22. The inorganic portion of the feed material will be melted and the metal oxides will be reduced to a metal, which is accumulated at the bottom of the molten bath 26. All of the non-reduced, non-metallic inorganic compounds will form the vitreous slag layer 36 disposed above the metal layer 34.

A gas vent or duct 48 is also provided in the upper end of the reactor vessel 22, which is designed to convey the produced syngas 44 at a temperature of about 875 to 1,000 degrees C. via a gas pipe 52 for further processing. The gas pipe 52 has a diameter to control the exit velocity of the product gas from the reactor in order to minimize particulate entrapment and to maximize the efficiency of the plasma gasification.

In the present embodiment, the upper portion of the reactor vessel 14, considered roughly from the opening 40 of the extrusion feed tube 38 to the top of the vessel, is formed to have a greater diameter, or width, than the lower portion of the vessel 14. This is so to decrease gas velocity prior to the syngas 44 reaching the vent 48. The purpose of the decrease in the gas velocity is to reduce the amount of particulates that can be carried over in the gas stream. This allows for a larger dwell time for the gas to reform and for better mixing of the pyrolytic reaction products. The particulates in the product gas will consist mainly of carbon particles that have not reformed to CO in the reactor and as such, represent lost potential for CO generation. The unreformed carbon represents a "wasted" potential fuel or chemical feedstock since only the gaseous products can be utilized downstream. It should be noted, however, that the reactor top section dimensions should be such that the increased volume does not result in a substantial reduction in temperature as the gas expands. It has been found that a ratio of upper interior diameter to lower interior diameter of about 1.4 to 1, achieves this goal.

The process of the present invention for converting the mixture of organic and inorganic portions of the feed materials into the vitreous slag and the syngas will now be explained. Initially, it should be understood that the present process has particular applications for the destruction of a wide variety of feed materials as well as for use in such industrial processes as coal gasification or the gasification of other feed materials. As the feed materials are delivered into the processing chamber 22 of the reactor vessel 14 by the feeder system 12, the feed materials will absorb energy by convection, conduction, and radiation from the plasma arc discharges generated, the hot vitreous slag, the heated refractory lining, and the heated gases circulating within the processing chamber 22. As the organic portion of the feed materials is heated, it becomes increasingly unstable until it eventually disassociates into its elemental components consisting mainly of carbon and hydrogen.

The syngas 44 which includes at least carbon monoxide, and hydrogen expands rapidly and flows from the processing chamber 22 to the gas pipe 52 via the gas vent or outlet 48, carrying with it a portion of any fine carbon particulate generated by the disassociation of the feed material. The process is designed to deliver the syngas 44 at a temperature of about 875 to 1,100 degrees C. for further processing. The gas pipe 52 is designed to be airtight so as to prevent the syngas 44 from escaping or allowing atmospheric air to enter. The gas pipe 52 is also preferably refractory lined in order to maintain the effective temperature of the syngas 44 above 875 degrees C. to substantially prevent the formation of complex organic components and to recover as much of the latent gas enthalpy as possible. Gas pipe 52 includes exhaust fan (not shown) for creating a low pressure area downstream from the vent 48 to assist in drawing syngas 44 from the reaction chamber 22.

The reactor vessel 14 according to the principles of the present invention is constructed having layered walls including an interior layer 51 comprising one or more layers of a refractory material, a middle insulating layer 53, and an outer insulating layer or layers 55 all housed within a steel shell 57. The interior layer 51 is a high density refractory material that can withstand the high temperatures generated within the vessel 14, and must not be susceptible to fluxing caused by contact with the slag layer 36. The insulating layer 53 preserves the energy generated within the vessel 14 preventing it from radiating through the walls of the reactor. The interior layer 51 preferably includes a plurality of layers of refractory and insulating materials decreasing in density from the interior to the outer portion of the chamber. Non-limiting examples of such materials include Tufline®, Greenal®, and other products such as Alumina.

The reactor bottom 16 can also be a multi-layer construction with its inner most layer being preferably a refractory layer 61, and then a lower insulating layer 63 and then a bottom layer of insulating material. The refractory layer 61 should be multiple layers of refractory materials decreasing in density from the interior to the bottom part of the vessel. However, it may be unnecessary to use a bottom with a multiple layer refractory if using a DC power source for plasma generation. Multiple refractory layers should be employed if using plasma torches or AC graphite electrodes. The particular refractory configuration for the bottom will need to be suitable for the type of electrode being used or to withstand the chemistry of the material being gasified as would be appreciated by those skilled in the art. The vessel also includes a bottom refractory configured to meet the requirements of the products being gasified and the requirements of the method being used to generate the plasma. Such bottoms may include any one of (or combination of) materials such as plastic refractories, refractory brick or even sintering powders such as Anchorhearth™. The vessel has at least one opening in the wall of the vessel for the introduction of feed material.

Those knowledgeable in refractories will recognize the multitude of varieties of refractories that may be used depending on the electrical requirements of the system and the potential chemical reactions induced by the feed material being gasified. For example, for many applications, a cindering powder may provide the best solution. The top of the reactor may be formed from a layer of castable refractory alumina-silica 71 and a layer of insulation. 73, inside the top of the steel shell 57.

The reactor includes a plurality of tap ports for extracting the pyrolytically reduced slag layer 36 and metal layer 34 components from the chamber. A slag tap port conduit 81 is located to be in communication with the slag layer 36 and is formed at a declining angle so that the opening on the interior of the vessel wall is lower than the remainder of the conduit 81. This prevents outside air from reaching the slag layer and contaminating the contents of the vessel. A metal tap port conduit 83 is located to be in communication with the metal layer 34. Also, the reactor vessel is preferably configured with an emergency metal tap port conduit 85 with an opening also in communication with the metal layer 34. This conduit is angled so that the opening is higher than the remainder of the conduit which slopes away from the reactor. This port is used in the event of a reactor emergency and the metal layer is required to be extracted quickly. Finally, an inlet conduit 89 for the insertion of gas is set through the roof of the vessel. This gas inlet conduit 89 may be used for the introduction of gases such as oxygen, steam, nitrogen, $CO_2$, an inert gas or even outside air if needed to displace syngas 44. Usually the gases will be added to chemically react with the syngas when the chemistry of the syngas needs to be stoichiometrically balanced.

Figure 2B:
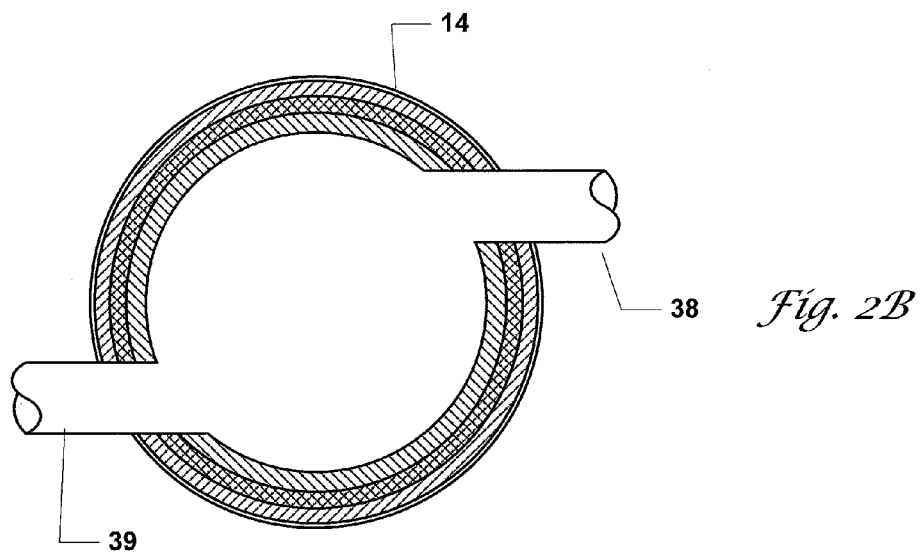
FIG. 2B is an elevation section view of the reactor vessel of FIG. 2A.
Figure 2A:
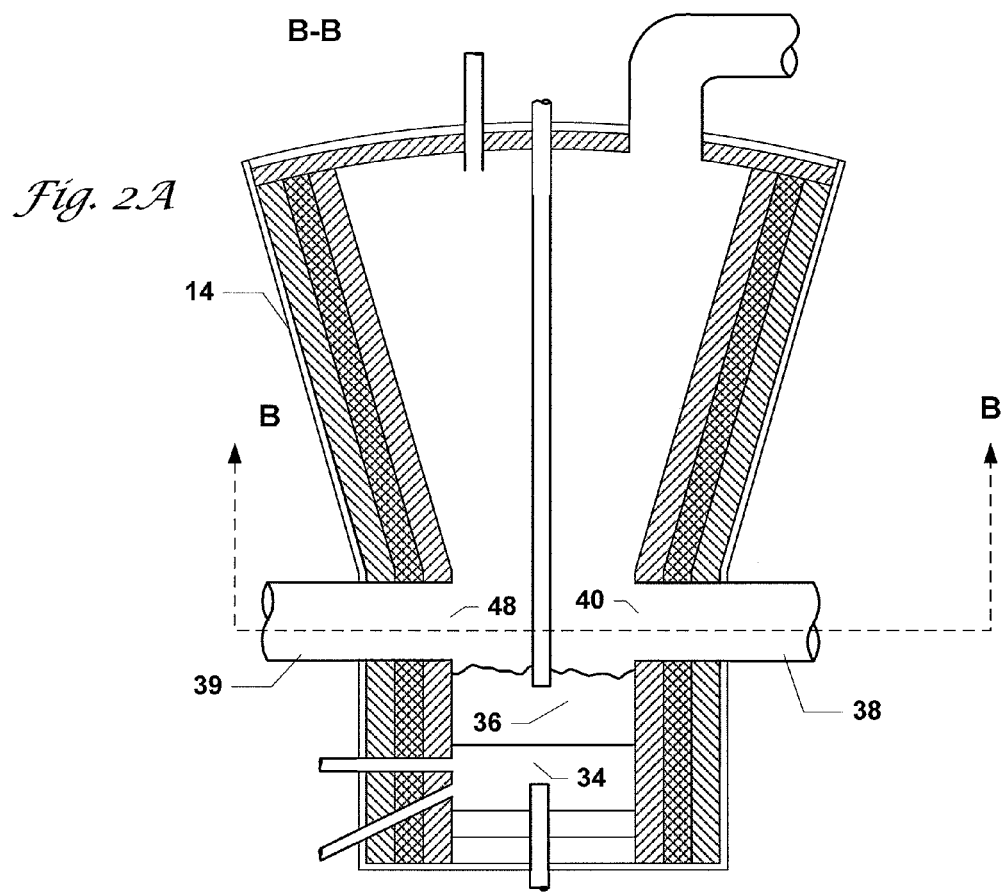
FIG. 2A is a plan view of the reactor vessel incorporating two feeder tubes.

FIG. 2A is a top-down plan section view and illustrates a further embodiment of a reactor according to the principles of the present invention. In this embodiment, a first extrusion tube 38 is located on one side of the reactor vessel 14. The tube 38 is located such that its axis is slightly offset from the radius of the circle defining the reactor. On the opposite side of the vessel, a second feeder extrusion tube 39 is located, again offset from the radius of the circle defining the reactor in the same configuration as the first tube 38. The feeders are offset to prevent from feeding material against the electrode which is located in the middle of the reactor. Another potential configuration is to locate the feeders parallel to each other on the same side of the reactor. It should be acknowledged that side-by-side placement of the feeders could create a weak region in the refractory in the space between the feeder chutes. Accordingly, in this configuration, a thicker refractory area is needed. This is preferable as the desired size of the reactor increases. FIG. 2B is an elevation section view showing the first and second feeder tubes 38, 39, with the openings of both tubes 40, 48 respectively defined in the wall of the reactor to be just above the slag layer 36.

Figure 3:
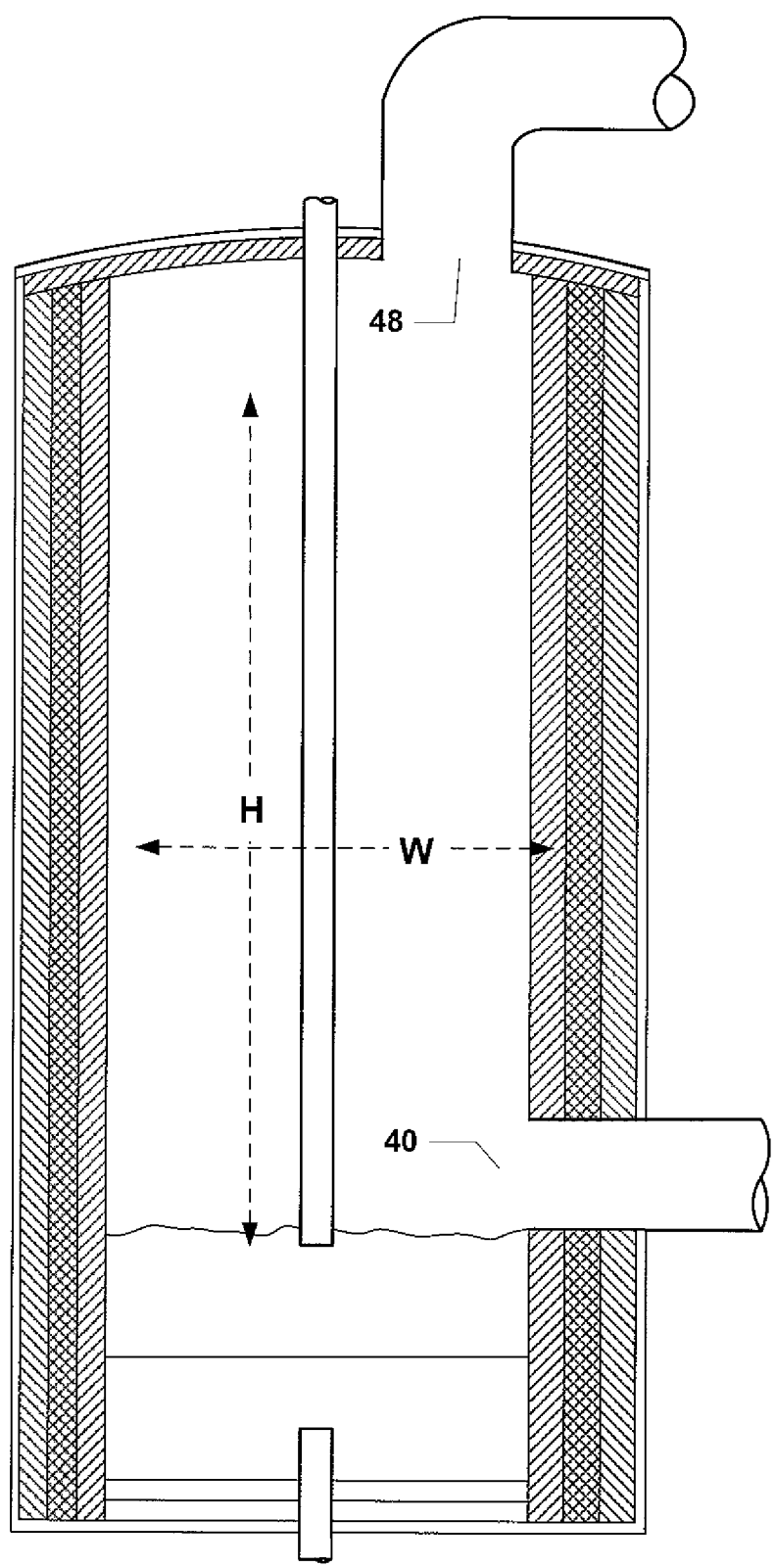
FIG. 3 is an elevation section view of an exemplary further embodiment of the reactor vessel.

A further embodiment is disclosed with reference to FIG. 3, an elevation section view of an exemplary reactor vessel 14, which is configured with a width W that is uniform throughout the height H of the reactor vessel. The reactor vessel height H is such that the volume of the upper portion, i.e., that portion of the reactor vessel above the opening of the feeder 40, allows a molecule of gas after dissociation of the fed materials about 1 to 2 seconds of dwell time prior to exiting the top of the reactor vessel 14 through gas vent 48.

As described above and shown in the associated drawings, the present invention comprises a reactor vessel for plasma gasification reactors. While particular embodiments of the invention have been described, it will be understood, however, that the invention is not limited thereto, since modifications may be made by those skilled in the art, particularly in light of the foregoing teachings. It is, therefore, contemplated that any claims issuing in an ensuing patent will cover any and all such modifications that incorporate those features or those improvements that embody the spirit and scope of the present invention.

I claim:

1. A reactor vessel for plasma gasification reactors wherein feed materials are introduced into said reactor vessel and subjected to high-energy generated by a plasma generating means so that the feed materials are dissociated into metals, slag and organic gases, said reactor vessel comprising:
   an upper portion and a lower portion, said lower portion for the containment of a first layer of molten metal and a second layer of slag and having a substantially uniform width, said upper portion being for the containment of organic gases and having a volume that permits residence time of a molecule of said organic gases of about 2 seconds
a steel shell;
multi-layered wall housed within said shell defining a chamber, said multi-layered wall having
- a first layer comprised of one or more sublayers of high-density refractory material,
- a second layer comprised of a medium density refractory material, and
- a third outer layer of low density insulating materials;

a refractory lined bottom housed within said shell;
a refractory lined top within said shell;
first and second openings of said vessel defined in the wall of said vessel on opposing sides thereof in said lower portion directly above the slag layer for the introduction of said feed materials into said reactor chamber, said first and second openings are offset with respect to the center of the vessel; and
an exit defined in said top for venting said organic gases.

2. The reactor vessel of claim 1, wherein said upper portion has a varying width.

3. The reactor vessel of claim 1, wherein said upper portion has a uniform width.

4. The reactor vessel of claim 1, wherein said bottom further comprises:
- a first bottom layer comprised of one or more layers of high-density refractory material, and
- a second bottom layer comprised of insulating materials.

5. The reactor vessel of claim 1, further comprising a tap port conduit in communication with said vessel chamber in the slag layer region thereof, wherein said tap port conduit is oriented at an upward angle with respect to said slag layer.

6. The reactor vessel of claim 1, further comprising an emergency tap port conduit in communication with said vessel chamber in molten metal layer region thereof, wherein said emergency tap port conduit is oriented at a downward angle with respect to said molten metal layer.

* * * * *